(12) United States Patent
Mehta

(10) Patent No.: US 12,152,481 B2
(45) Date of Patent: Nov. 26, 2024

(54) SYSTEM AND METHOD FOR DRILLING PERFORMANCE BENCHMARKING AND DRILLING ADJUSTMENT

(71) Applicant: AKM Enterprises, Inc., Houston, TX (US)

(72) Inventor: Amit Mehta, Houston, TX (US)

(73) Assignee: AKM Enterprises, Inc., Houston, TX (US)

( * ) Notice: Subject to any disclaimer, the term of this patent is extended or adjusted under 35 U.S.C. 154(b) by 21 days.

(21) Appl. No.: 17/525,819

(22) Filed: Nov. 12, 2021

(65) Prior Publication Data

US 2022/0154570 A1 May 19, 2022

Related U.S. Application Data

(60) Provisional application No. 63/205,077, filed on Nov. 16, 2020.

(51) Int. Cl.
*E21B 44/00* (2006.01)
*E21B 7/04* (2006.01)
(Continued)

(52) U.S. Cl.
CPC .............. *E21B 44/00* (2013.01); *E21B 7/04* (2013.01); *E21B 41/0035* (2013.01);
(Continued)

(58) Field of Classification Search
CPC ........ E21B 44/00; E21B 7/04; E21B 41/0035; E21B 45/00; E21B 49/003; E21B 49/005;
(Continued)

(56) References Cited

U.S. PATENT DOCUMENTS 11,086,492 B2 * 8/2021 Ramchune .......... G06F 3/04847
2012/0123756 A1 * 5/2012 Wang ...................... E21B 44/00
703/2

(Continued)

FOREIGN PATENT DOCUMENTS

CN 111550186 B * 5/2022 ............. E21B 49/00

OTHER PUBLICATIONS

Sanderson, D., Payette, and et al. "Field Application of a Real-Time Well-Site Drilling Advisory System in the Permian Basin." Paper presented at the SPE/AAPG/SEG Unconventional Resources Technology Conference, Austin, Texas, USA, Jul. 2017. doi: https://doi.org/10.15530/URTEC-2017-2670861 (Year: 2017).*

(Continued)

*Primary Examiner* — Douglas Kay
(74) *Attorney, Agent, or Firm* — Womble Bond Dickinson (US) LLP

(57) ABSTRACT

An apparatus and method for operating a new well includes receiving a plurality of data relating to drilling operations from a plurality of wells in a region, the data including data from a plurality of sensors at each of the plurality of wells and data regarding equipment used for the drilling operations at each of the plurality of wells. A plurality of parameters is calculated based on the collected data from the plurality of wells. At least one equipment and at least one operating parameter are identified to use for drilling operation of the new well within the region based on the received data and the calculated parameters. The identified at least one equipment and at least one operating parameter are applied to use for the drilling operation of the new well.

19 Claims, 9 Drawing Sheets

(51) Int. Cl.
*E21B 41/00* (2006.01)
*E21B 45/00* (2006.01)
*E21B 49/00* (2006.01)
*G06Q 10/0639* (2023.01)

(52) U.S. Cl.
CPC ............ *E21B 45/00* (2013.01); *E21B 49/003* (2013.01); *E21B 49/005* (2013.01); *G06Q 10/0639* (2013.01); *E21B 2200/20* (2020.05); *E21B 2200/22* (2020.05)

(58) Field of Classification Search
CPC .. E21B 2200/20; E21B 2200/22; E21B 41/00; G06Q 10/0639
See application file for complete search history.

(56) References Cited

U.S. PATENT DOCUMENTS

| | | | | |
|---|---|---|---|---|
| 2014/0257775 | A1* | 9/2014 | Levitan | G01V 99/005 703/2 |
| 2015/0129306 | A1* | 5/2015 | Coffman | E21B 44/00 175/48 |
| 2016/0053603 | A1* | 2/2016 | Israel | E21B 44/00 702/6 |
| 2016/0124116 | A1* | 5/2016 | Souche | G01V 99/005 703/2 |
| 2019/0284909 | A1* | 9/2019 | Spencer | G06N 20/20 |
| 2019/0345808 | A1* | 11/2019 | Suryadi | E21B 43/12 |
| 2019/0361146 | A1* | 11/2019 | Roth | G01V 1/50 |
| 2020/0257420 | A1* | 8/2020 | Ramchune | E21B 41/00 |
| 2021/0198984 | A1* | 7/2021 | Dumenil | G06G 7/48 |

OTHER PUBLICATIONS

Shumakov, Y., and et al. "A New Benchmark in HPHT Operations: Safe and Successful Well Testing On the Jackdaw Gas Condensate Field in the North Sea, UK." In SPE Norway Subsurface Conference?, pp. SPE-169232. SPE, 2014 (Year: 2014).*

Tavallali, M. S., and et al. "Well placement, infrastructure design, facility allocation, and production planning in multi-reservoir oil fields with surface facility networks." Industrial & Engineering Chemistry Research 53, No. 27 (2014): 11033-11049 (Year: 2014).*

Miller, C., and et al. "A Structured Approach to Benchmarking Bit Runs and Identifying Good Performance for Optimization of Future Applications." Paper presented at the SPE Middle East Oil and Gas Show and Conference, Manama, Bahrain, Mar. 2009. doi: https://doi.org/10.2118/120622-MS (Year: 2009).*

Bello, O., and et al. "Hybrid Intelligent Decision Support System for Drill Rig Performance Analysis and Selection During Well Construction." Paper presented at the International Petroleum Technology Conference, Bangkok, Thailand, Nov. 2016. doi: https://doi.org/10.2523/IPTC-18964-MS (Year: 2016).*

* cited by examiner

BENCHMARKING AGAINST COMPETITORS

📈 Days and Costs

- ⊙ Days vs. Depth
- ○ Days
- ○ Cost
- ○ NPT (NEW)
- ○ Rig Performance

📈 Rate of Penetration

- ○ ROP
- ○ Slide Percent
- ○ Drilling Parameters

FIG. 6

SYSTEM AND METHOD FOR DRILLING PERFORMANCE BENCHMARKING AND DRILLING ADJUSTMENT

PRIORITY

This application claims priority to provisional application 63/205,077 filed on Nov. 12, 2020. This application incorporates by reference the content of provisional application 63/205,077.

BACKGROUND

Field

This disclosure relates to field of drilling performance and to an apparatus and method for collecting and deriving drilling performance to adjust drilling operations.

Description of the Related Art

To improve operational efficiency for drilling operations, operators try different technologies such as new bits, bottomhole assembly (BHA) components, string designs, well designs, and new operating parameters for these technologies. Optimizing these operating parameters takes time to implement, typically requires some trial and error, and always requires performance tracking (such as time) and cost tracking to determine overall performance gains on a well-by-well basis.

Operations for drilling rely on performance benchmarks available to the industry based on available public data, usually provided by vendors working with different operators in different areas. This benchmark information is qualitative, often skewed, and manually determined, which does not provide effective comparison information. It also lacks actual raw sensor data or downhole tool information from all offset operators. Due to these limitations, the operators are limited to comparing a disparate variety of operational performance indications for their wells. Moreover, the vendors often skew a significant portion of the vendor-presented data statistics to show better performance than the actual performance.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is an example of a presentation on a GUI according to an embodiment;

DETAILED DESCRIPTION

Figure 1:
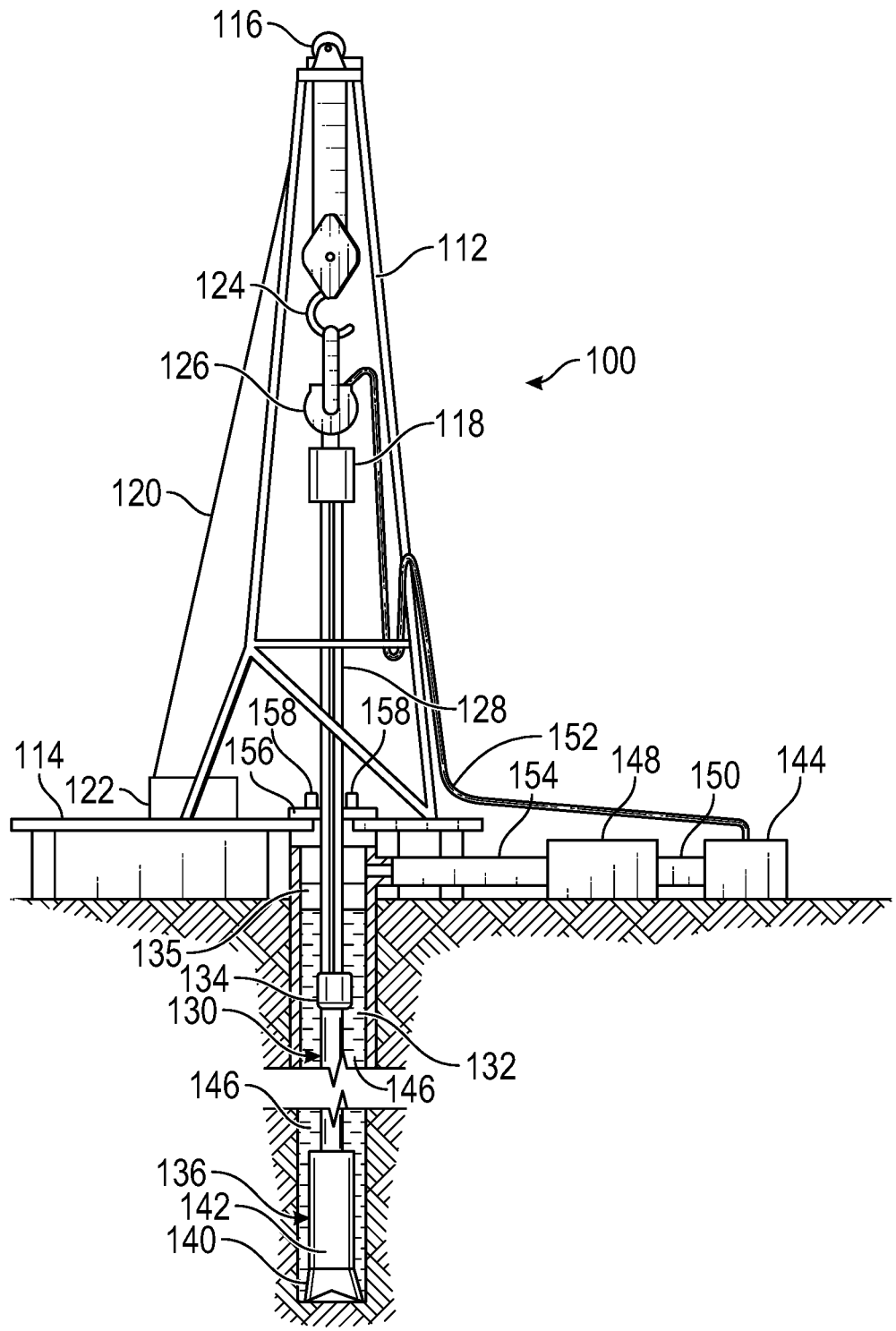
FIG. 1 is a schematic diagram of a drilling rig in accordance with one embodiment.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in simplified form in order to avoid obscuring the concepts of the subject technology.

In the drawings referenced herein, like reference numerals designate identical or corresponding parts throughout the several views or embodiments.

According to embodiments disclosed herein, it is possible to collect high quality, high resolution sensor data in real-time, such as every second, minute, or hour, from a variety of operators, apply algorithms to process that data to create useful information about the state of each well from which date is collected, and determine a multitude of operational well and rig performance indicators that can enable operators to compare their true well performance to other offset operators in the same region, same county, same basin, same state, or within a desired radial distance. Moreover, by collecting the data in real-time from the sensors, the vendors and operators of the other wells cannot skew the data.

With this accurate, real-time information that includes not only operational well and rig performance indicators from wells in the region, but also information regarding drilling equipment including bottom hole assemblies (BHAs), motors, drill bits and other equipment, operators can identify and use drilling equipment and operational parameters that are more appropriate and more likely to provide the best results when drilling a new well in that region. As a result, operators can significantly reduce planning cycles, review key performance indicators that allow the operators to accurately compare and improve performance in a specific operating area, give users accurate insights instantly like actual spud dates otherwise unobtainable from existing benchmarking solutions, show investors consistent and true performance amongst other oil and gas operators to attract investment, identify assets to buy and sell in the current market, and search for potential investment areas according to drilling methods and times from the wells in the regions.

Key performance indicators (KPIs) include data such as true days versus depth curves, slide versus rotate percentages, and tripping times. To obtain more detailed KPIs for drilling and related activities, it is useful to have access to high-quality datasets. That means not only getting data from multiple wells in a region, including wells operated by different vendors or operators, but also getting data that can be collected and correlated across those wells. Collecting and correlating that data includes addressing data quality issues, such as sensor calibration, data frequency (e.g., 10 seconds, 5 seconds, 1 second, etc.), consistent variable naming, and data storage. Addressing these data quality issues to provide consistency for the data collected across the various wells enables the application of algorithms from simple logic statements to more complex mathematical calculations to derive new and improved KPIs.

To improve data quality, operators and service companies can standardize rig data acquisition systems, industrializing rig connectivity, and utilizing cloud-based systems to store the data and have those readily accessible. With this improvement, operators can obtain an internal understanding of performance gains, from on-bottom drilling performance, tripping times, and connections times. In addition, these performance gains can be subdivided by well, hole section, bit type, BHA type, formation, operating parameter, and a host of other categories to develop a more detailed understanding of where and how performance gains have been achieved. Cloud computing and remote access can make these indicators available at a rig site to track performance in real-time down to minutes or seconds in comparison to relevant offset wells.

Data can be aggregated from different sources such as electronic drilling recorders, measurement while drilling (MWD) tools, and planning and reporting systems. The aggregated data can be quality controlled to ensure that the raw data received are correct. In addition, the data need can be stored on secure servers that are only available to approved users. Finally, a robust and consistent analytics engine can be applied to the data to derive the KPIs.

To maintain confidentiality and protect any intellectual property, the KPIs delivered to operators can be limited to the level of details the operators are willing to share, and operator names can be kept hidden. For data collection, the data is preferably collected from raw sensor data to avoid any bias or reporting errors. The data can also be collected in real-time to ensure all us and from all operators internal operating systems to ensure all users have the most relevant information readily available. The collected data is preferably complete across a basin or other relevant region so that all wells regardless of performance are available for benchmarking without skewing or misrepresenting overall performance.

Through this data collection and derivation of KPIs, operators are provided with realistic benchmarking operations against other players in the basin or other relevant region and use that information to drive their own operations to improved levels of efficiency. Because the data is collected and presented in real-time, operators can compare in real time how their BHA, string, operating parameters, procedure changes, or other configurations are improving performance when compared to others.

A significant portion of the relevant data is collected from the operations of drilling rigs operating in wells in a particular region, such as the same basin, county, or within a certain radial distance of a new or existing well. Drilling rigs are typically rotary-typed rigs that use a sharp bit to drill through the earth. At the surface of the well, a rotary drilling can include a complex system of cables, engines, support mechanisms, tanks, lubricating devices, and pulleys to control the position and rotation of the bit below the surface. Underneath the surface of the well, the bit can be attached to a long drill pipe that carries drilling fluid to the bit. The drilling fluid both lubricates and cools the bit in addition to removing cuttings and debris from the well bore. In operation, the drilling fluid provides a hydrostatic head of pressure that prevents the collapse of the well bore until it can be cased, which prevents formation fluids from entering the well bore that may otherwise lead to gas kicks and other dangerous situations.

FIG. 1 is a schematic diagram of a drilling rig in accordance with one embodiment. As shown in FIG. 1, a drilling rig 100 can be a conventional rotary land rig but can alternatively be configured for other suitable drilling technologies such as top drive, power swivel, down hole motor, or coiled tubing units, as well as to non-land rigs, such as jack up rigs, semi-submersibles, drill ships, or mobile offshore drilling units (MODUs) that are operable to bore through the earth to resource-bearing or other geologic formations.

The rig 100 includes a mast 112 that is supported above a rig floor 114. A lifting gear includes a crown block 116 mounted to the mast 112 and a travelling block 118. The crown block 116 and the travelling block 118 are interconnected by a cable 120 that is driven by draw works 122 to control the upward and downward movement of the travelling block 118. The travelling block 118 carries a hook 124 from which is suspended a swivel 126. The swivel 126 supports a kelley 128, which in turn supports a drill string 130 in the well bore 132. A blow out preventor (BOP) 135 is positioned at the top of the well bore 132. The string may be held by slips 158 during connections and rig-idle situations or at other appropriate times.

The drill string 130 can include a plurality of interconnected sections of drill pipe or coiled tubing 134 and a bottom hole assembly (BHA) 136. The BHA 136 includes a rotary drilling bit 140 and a down hole, or mud, motor 142. The BHA 136 may also include stabilizers, drill collars, measurement well drilling (MWD) instruments, and the like. Mud pumps 144 draw drilling fluid, or mud, 146 from mud tanks 148 through suction line 150. The drilling fluid 146 is delivered to the drill string 130 through a mud hose 152 connecting the mud pumps 144 to the swivel 126. From the swivel 126, the drilling fluid 146 travels through the drill string 130 to the BHA 136, where it turns the down hole motor 142 and exits the bit 140 to scour the formation and lift the resultant cuttings through the annulus to the surface. At the surface, the mud tanks 148 receive the drilling fluid from the well bore 132 through a flow line 154. The mud tanks 148 and/or flow line 154 include a shaker or other device to remove the cuttings.

The mud tanks 148 and mud pumps 144 may include trip tanks and pumps for maintaining drilling fluid levels in the well bore 132 during tripping out of hole operations and for receiving displaced drilling fluid from the well bore 132 during tripping-in-hole operations. The trip tank can be connected between the well bore 132 and the shakers. A valve can be operable to divert fluid away from the shakers and into the trip tank, which can be equipped with a level sensor. Fluid from the trip tank can then be directly pumped back to the well bore 132 via a dedicated centrifugal pump instead of through the standpipe.

Drilling is accomplished by applying weight to the bit 140 and rotating the drill string 130, which in turn rotates the bit 140. The drill string 130 can be rotated within bore hole 132 by the action of a rotary table 156 rotatably supported on the rig floor 114. Alternatively, the down hole motor may rotate the bit 140 independently of the drill string 130 and the rotary table 156. The cuttings produced as bit 140 drills into the earth can be carried out of bore hole 132 by the drilling fluid 146 supplied by pumps 144.

Figure 2:
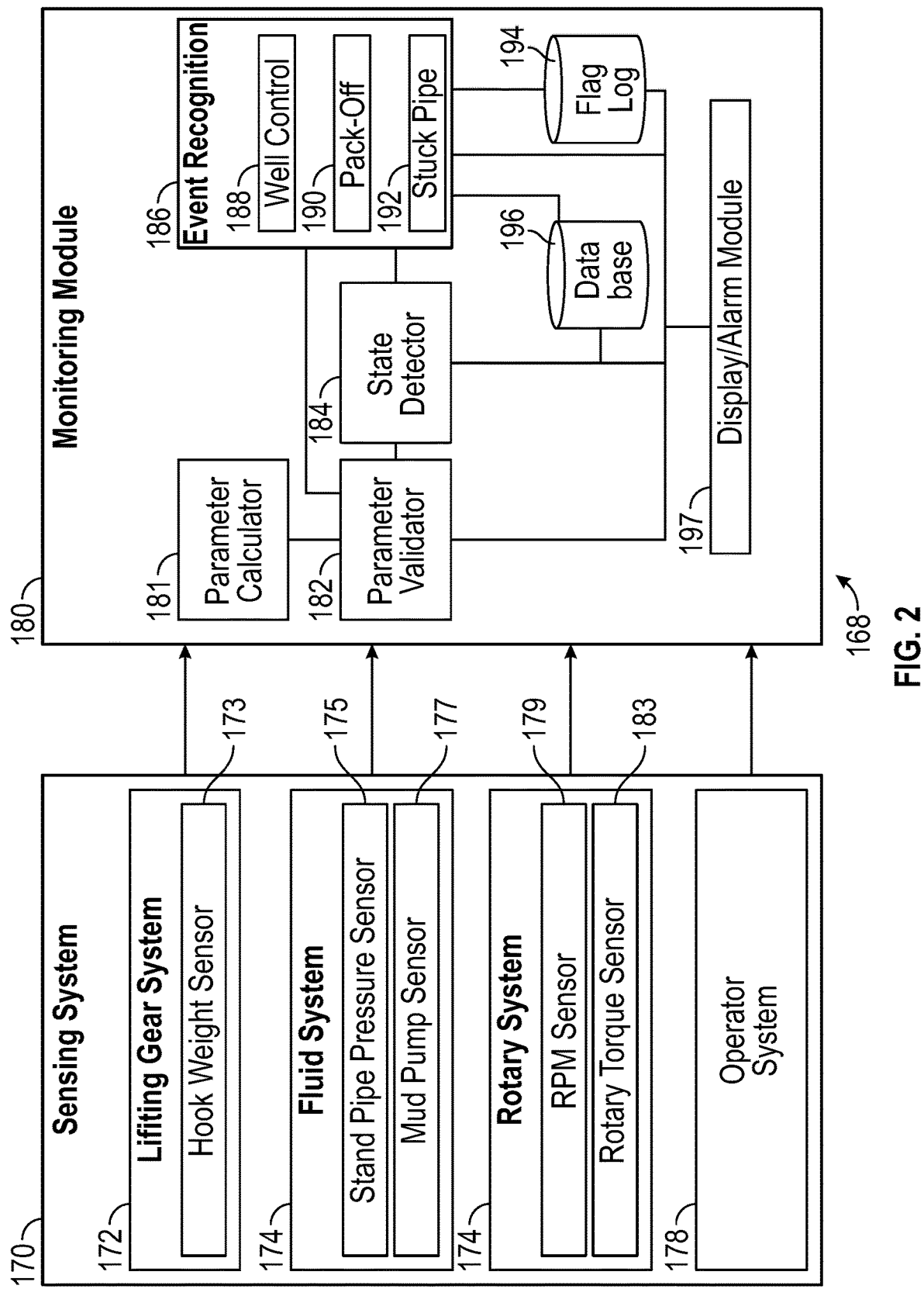
FIG. 2 is a block diagram of a monitoring system for a drilling operation in accordance with an embodiment.

While the drilling rig operates, a monitoring system preferably monitors the operation of the drilling rig and provides relevant data to operators. This monitoring system can be implemented at every well in a particular region, such as a basin, to enable all of the relevant data from those wells to be collected. FIG. 2 is a block diagram of a monitoring system for a drilling operation in accordance with an embodiment.

As shown in FIG. 2, a well monitoring system 168 can be implemented as a drilling monitoring system 168 for the rig 100. The monitoring system 168 comprises a sensing system 170 and a monitoring module 180 for drilling operations of the rig 100. Well monitoring systems for other well operations may comprise a sensing system with sensors similar, analogous or different to those of sensing system 170 for use in connection with a monitoring module, which may be similar, analogous or different than module 180. As described in more detail below, drilling operations may comprise drilling, tripping, testing, reaming, conditioning, and other operations or states of the drilling system. A state may be any suitable operation or activity or set of operations or activities of which all, some or most are based on a plurality of sensed parameters.

The sensing system 170 includes a plurality of sensors that monitor, sense, and report data or parameters on the rig 100, in the bore hole 132, or both. The reported data may comprise the sensed data or may be derived, calculated or inferred from sensed data. As shown in FIG. 2, the sensing system 170 can include a lifting gear system 172 that reports data sensed by or for the lifting gear, a fluid system 174 that reports data sensed by or for the drilling fluid tanks, pumps, and lines, a rotary system 176 that reports data sensed by or for the rotary table or other rotary device, and an operator system 178 that reports data input by a driller/operator. Like any of the sensed data, it may be refined, manipulated or otherwise processed before being reported to the monitoring module 180. The sensors can be classified or grouped differently in the sensor system 170 and data can be received from other additional or different systems, subsystems, and items of equipment.

The lifting gear system 172 can include a hook weight sensor 173 having digital strain gauges or other sensors that report a digital weight value at a particular sampling rate, such as once a second. The hook weight sensor 173 may be mounted to the static line (not shown) of the cable 120.

The fluid system 174 can include a standpipe pressure sensor 175 that reports a digital value at a sampling rate of the pressure in the standpipe. The drilling fluid system can also include a mud pump sensor 177 that measures mud pump speed in strokes per minute, from which the flow rate of drilling fluids into the drill string can be calculated. Additional or alternative sensors can be included in the drilling fluid system 174 including, for example, sensors for measuring the volume of fluid in mud tank 146 and the rate of flow into and out of mud tank 146. Sensors can also be included for measuring mud gas, flow line temperature, and mud density.

The rotary system 176 can include a rotary table revolutions per minute (RPM) sensor 179 that reports a digital value at a sampling rate. The RPM sensor 179 can also report the direction of rotation. A rotary torque sensor 183 can also be included to measure the amount of torque applied to drill string 134 during rotation. The torque may be indicated by measuring the amount of current drawn by the motor that draws rotary table 146. The rotary torque sensor 183 can alternatively sense the tension in the rotary table drive chain.

The operator system 178 comprises a user interface or other input system that receives input from a human operator who monitors and reports observations made during the course of drilling. For example, bit position (BPOS) may be reported based upon the length of the drill string 130 that has gone down hole, which in turn is based upon the number of drill string segments the driller has added to the string during the course of drilling. The operator can keep a tally book of the number of segments added and can input this information in a Supervisory Control and Data Acquisition (SCADA) reporting system.

Other parameters can be reported or calculated from reported values. For example, other suitable hydraulic and mechanical data can be reported. Hydraulic data is data related to the flow, volume, movement, rheology, and other aspects of drilling or other fluid performing work or otherwise used in operations. The fluids may be liquid, gaseous, or otherwise. Mechanical data is data related to support or physical action upon or of the drill string, bit, or any other suitable device associated with the drilling or other operation.

Mechanical and hydraulic data can originate with any suitable device operable to accept, report, determine, estimate a value, status, position, movement, or other parameter associated with a well operation. The mechanical and hydraulic data can originate from machinery sensor data such as motor states and RPMs and for electric data such as electric power consumption of top drive, mud transfer pumps, or other satellite equipment. For example, mechanical and hydraulic data can originate from dedicated engine sensors, centrifugal on/off sensors, valve position switches, fingerboard open/close indicators, SCR readings, video recognition, and any other suitable sensor operable to indicate and report information about a device or operation of a system. In addition, sensors for measuring well bore trajectory and petrophysical properties of the geologic formations, as well down hole operating parameters, can be sensed and reported. Down hole sensors may communicate data by wireline, mud pulses, acoustic wave, or other systems.

The data can be received from a large number of sources and types of instruments, instrument packages, and manufacturers and can be in many different formats. The data can be used as initially reported or can be reformatted and converted. In one embodiment, data can be received from two, three, five, ten, twenty, fifty, a hundred, or more sensors and from two, three, five, ten, or more systems. That data and information determined from the data can be a value or other indication of the rate, level, rate of change, acceleration, position, change in position, chemical makeup, or other measurable information of any variable of a well operation.

The monitoring module 180 receives and processes data from the sensing system 170 or from other suitable sources and monitors the drilling system and conditions based on the received data. In an embodiment, the monitoring system 80 can include a parameter calculator 181, a parameter validator 182, a drilling state determination detector 184, an event recognition module 186 for recognizing events like well control 188, pack-off 190, or stuck pipe 192, a database 196, a flag log 194, and a display/alarm module 197, although it can also include other or different programs, modules, functions, database tables and entries, data, routines, data storage, and other suitable elements, and that the various components may be otherwise integrated or distributed between physically disparate components. In one embodiment, the monitoring module 180 and its various components and modules can comprise logic encoded in media. The logic may comprise software stored on a computer-readable medium for use in connection with a general-purpose processor, or programmed hardware such as application-specific integrated circuits (ASIC), field programmable gate arrays (FPGA), digital signal processors (DSP), or other circuitry.

The parameter calculator 181 can derive, infer, or otherwise calculate state indicators for drilling operations based on reported data for use by the remainder of monitoring system 180. Alternatively, the calculations can be conducted by processes or units within the sensing systems themselves, by an intermediary system, the drilling state detector 184, or by the individual module of the monitoring system 180. A state indicator is a value or other parameter based on sensed data and is indicative of the state of drilling operations. In one embodiment, the state indicators comprise measured depth (MD), hook load (HKLD), bit position (BPOS), standpipe pressure (SPP), and rotary table revolutions per minute (RPM).

The state indicators, either directly reported or calculated via calculator 181 and other parameters, can be received by the parameter validator 182, which recognizes and eliminates corrupted data and flags malfunctioning sensor devices. In one embodiment, the parameter validation compares each parameter to a status and/or dynamic allowable range for the parameter. The parameter is flagged as invalid if outside the acceptable range. Reports of corrupted data or malfunctioning sensor devices can be sent to and stored in flag log 194 for analysis, debugging, and record keeping.

The validator 182 can be configured to smooth or statistically filter incoming data. Validated and filtered parameters can be directly utilized for event recognition or to determine the state drilling operations of the rig 100 via the drilling state determination detector 184.

The drilling state determination detector 184 can use combinations of state indicators to determine the current state of drilling operations. The state may be determined continuously at a suitable update rate and in real-time. A drilling state is an overall conclusion regarding the status of the well operation at a given point in time based on the operation of and parameters associated with one or more key drilling elements of the rig 100. Such elements may include the bit, string, and drilling fluid.

Drilling parameters, drilling states, and alert flags can be displayed to the user on display/alarm module 197, stored in database 296, and made accessible to other modules within monitoring system 180 or to other systems or users as appropriate. Database 196 can be configured to record trends in data over time.

Figure 3:
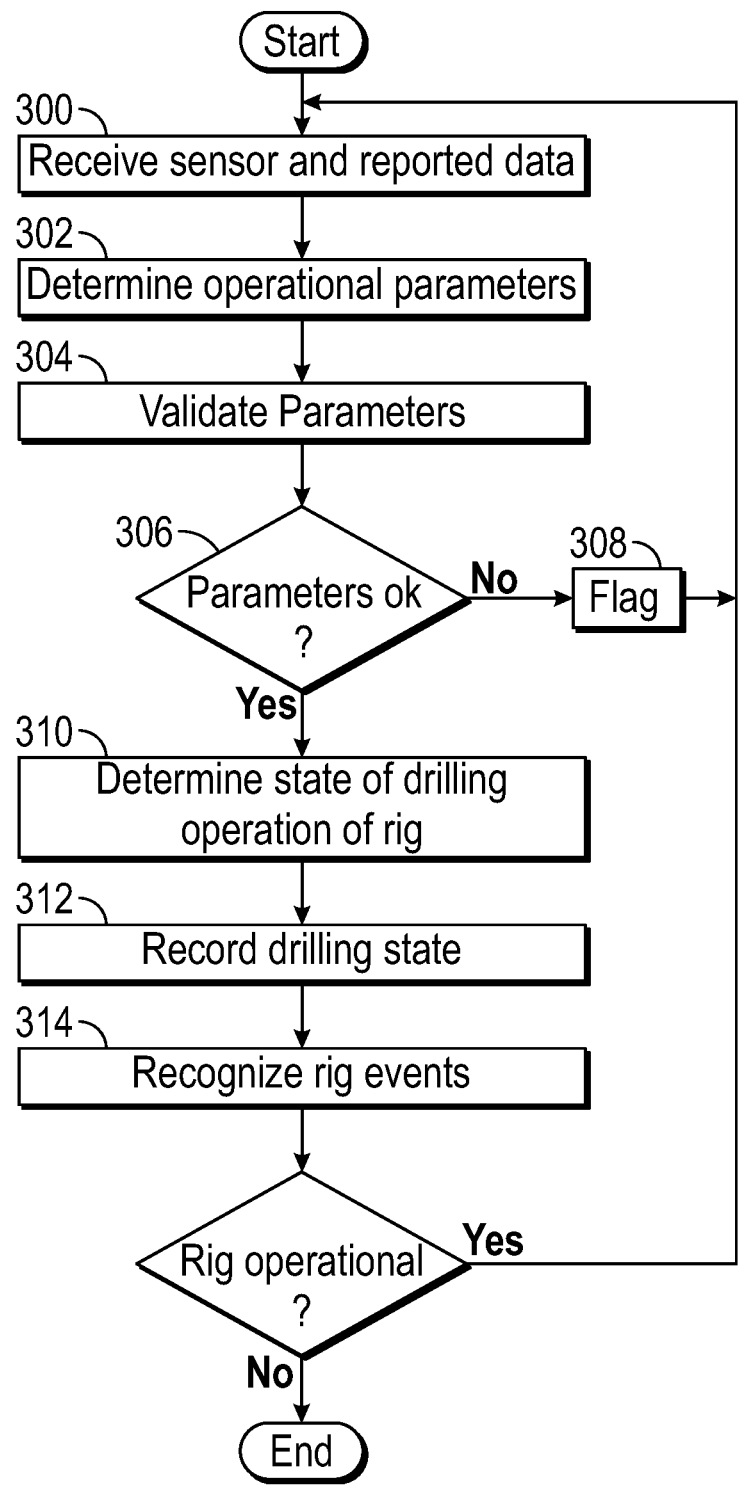
FIG. 3 illustrates a method for monitoring a rig in accordance with one embodiment.

FIG. 3 illustrates a method for monitoring a rig in accordance with one embodiment. As shown in FIG. 3, while the rig 100 is operating, the monitoring system 180 receives data (step 300). The data can be from the lifting gear system 172, the drilling fluid system 174, the rotary system 176, the driller/operator system 178 or from other sensors or systems of the drilling rig 100. For data corresponding to parameters not usable in their present form or format, state indicators or other parameters can be calculated from the reported data (step 302).

The parameters can be validated and filtered (step 304). Validation can be accomplished by comparing the parameters to pre-determined or dynamically determined limits, and the parameters used if they are within those limits. Filtering can occur via the use of filtering algorithms such as Butterworth, Chebyshev type I, Chebyshev type II, Elliptic, Equiripple, least squares, Bartlett, Blackman, Boxcar, Chebyshev, Hamming, Hann, Kaiser, FFT, Savitzky Golay, Detrend, Cumsum, or other suitable data filter algorithms.

If any data fails validation (step 306), the invalid data is flagged and recorded in the flag log (step 308). Determinations based on inputs for which invalid data was received can be omitted during the corresponding cycle, a previous value of the input can be used, or a value based on a trend of the input can be used.

For parameters that are validated, validated and filtered operational parameters can be utilized to determine the state of drilling operations of the rig 100 (step 310). The drilling state and data trends can be recorded in the database 196 (step 312). In addition, drilling state information and operational parameters can be utilized to recognize drilling events (step 314). The process continues while the rig 100 remains in operations (step 314).

For example, mud fluid circulation systems generally include a series of stages that may be identified by using mechanical and hydraulic data as feedback from the associated system. Mud fluid circulation systems are generally used to maintain hydrostatic pressure for well control, carry drill cuttings to the surface, and cool and/or lubricate the drill bit during drilling. The mud or water used to make up the drilling fluid may require treatment to remove dissolved calcium and/or magnesium. Soda ash may be added to form a precipitate of calcium carbonate. Caustic soda (NaOH) may also be added to form magnesium hydroxide. Accordingly, fluid characteristics (such as pressure and fluid-flow rate) and chemical-based parameters may be suitably monitored in accordance with the teachings of the present invention in order to determine one or more of the identified states or other states of the operations.

Production operations can encompass any operations involved in bringing well fluids (or natural gas) to the surface and can also include preparing the fluids for transport to a suitable refinery or a next processing destination, and well treatment procedures used generally to optimize production. The first step in production is to start the well fluids flowing to the surface (generally referred to as "well completion"). Well servicing and workover includes performing routine maintenance operations (such replacing worn or malfunctioning equipment) and performing more extensive repairs. Well servicing and workover are an intermittent step and generally a prerequisite in order to maintain the flow of oil or gas. Fluid can be then separated into its components of oil, gas, and water and then stored and treated (for purification), suitably measured, and properly tested where appropriate before being transported to a refinery. Well workovers can additionally involve recompletion in a different pay zone by deepening the well or by plugging back. Each of these procedures can be monitored such that feedback is provided in order to determine one or more of the identified states or other states of the corresponding operation.

The monitoring system can be used in connection with any suitable system, architecture, operation, process or activity associated with petroleum or geosystem operations of a well capable of providing an element of feedback data such that a stage associated with the operation can be detected, diagnosed, or identified. In these operations, the drilling rig 100 need not be on location. Rather, sensor data can be retrieved via wireline and/or mud pulses from down hole equipment and/or directly from surface equipment and systems.

While the monitoring system provides useful information at a particular well, the collection of data from multiple wells, particularly ones in the same region, such as the same basin, can provide useful insights into the best configuration for a new well in that region, as well as modifications to operations of existing wells in that region. Drilling and completion personnel can monitor real-time information continuously and in real-time to make decisions on the fly, but only have access to their active or historical wells to compare their performance against multitude of performance indicators to compare and improve performance continuously.

By collecting data across multiple wells in a region, including wells operated by competitors, an operator at a particular well can compare its performance against a multitude of performance indicators of its own wells and those of its competitors nearby the area of interest, such as in the same county, same basin, same state, same formations, or within a certain distance of target wells. This collection enables the operator to get accurate data driven operational insights and improve performance not just based on their own well only but also competitor wells nearby. Useful well and rig indicators include, for example, rate of penetration (ROP), weight on bit (WOB), Torque, and differential pressures.

Figure 4:
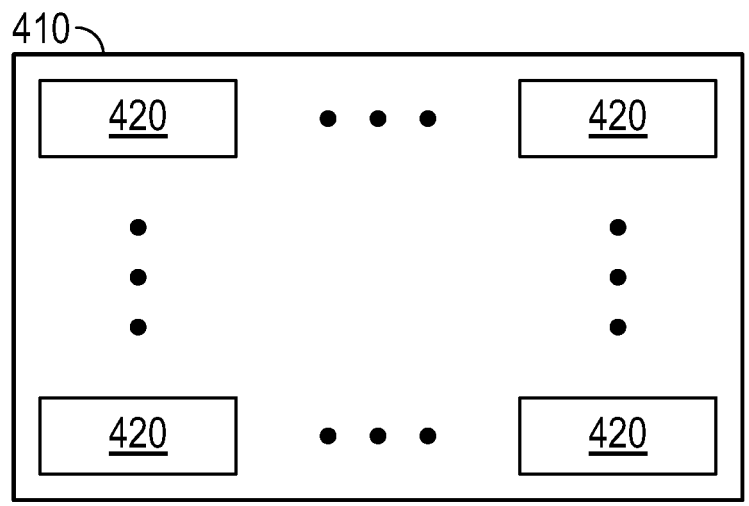
FIG. 4 is an example of multiple wells in a region of interest.

FIG. 4 is an example of multiple wells in a region of interest. As shown in FIG. 4, a region of interest 410 can include a multitude of wells 420 spread throughout the region 410. The wells 420 can be run by multiple, different operators or drillers and/or can be operated by multiple, different competitor drilling companies. In addition, each operator, driller, or drilling company can own and operate one or more of the wells 420. The region 410 can correspond to, for example, a particular basin, a particular county, a particular state, a particular area within a specified distance such as 1, 5, or 10 miles, or any other desirable region.

Each well 420 probably includes drilling equipment, a monitoring system such as shown in FIG. 2, and a plurality of sensors for monitoring and detecting drilling conditions and performance. As explained above, the monitoring system can receive data from the sensors and use that data to calculate parameters of interest to the operator or driller at that well 420. In addition to providing data of a particular well 420 to the operator or driller of that well 420, each well 420 preferably includes communication lines to provide wired or wireless communication of the collected data to a central repository, communication hub, or database (e.g., a cloud database) that can store and process the data from each of the wells 420 in the region 410. This communication of the data from each of the wells 420 is preferably provided in real-time and can be provided in particular time increments such as 1, 5, or 10 seconds.

Figure 5:
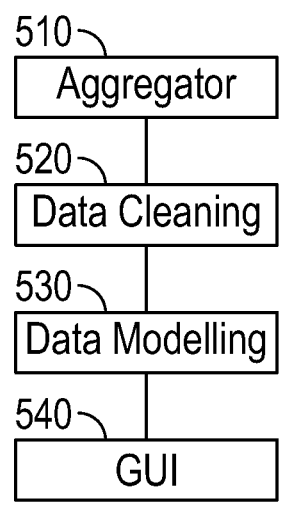
FIG. 5 is an example of a data processing system according to an embodiment.

FIG. 5 is an example of a data processing system according to an embodiment. as shown in FIG. 5, the data processing system includes an aggregator 510, a data cleaning module 520, data modeling module 530, and a graphical user interface (GUI) 540. Each of the components of the data processing system can be implemented in hardware, software, or a combination thereof. The hardware can include, for example, circuitry, processing units, microprocessors, microcontrollers, gate arrays, ASICs, memory, RAM, ROM, or any combination thereof. The software can include, for example, programming modules or programming instructions that can be stored, for example, in a computer readable medium such as RAM, ROM, disk, or other format capable of storing and providing instructions to hardware.

Aggregator 510 can be configured to receive raw and/or processed data from each of the wells 420 in a region 410, from wells 420 in multiple regions 410, and/or one or more wells 420 in any of one or more regions 410 as desired. The data can be received through wired or wireless communication, via the Internet, through a cellular network, or any other communication system capable of transporting data from the wells to the data processing system. The aggregator 510 can receive and store the date in a local storage, database, cloud, or other system capable of storing the data in an accessible manner. The aggregator 510 is properly configured to receive and store the data in a manner that associates the received data with the well 420 from which it received the data. The received data can include, for example, bit depth, hole depth, block position, hook load, differential pressure, mud flow in, weight on bit, azimuth correction, gammal depth, pump pressure, rate of penetration, fuel usage, surface torque, total gas, total tank volume, inclination, mud flow out, axial vibration, lateral vibration, stick slip severity, RPM, and any other relevant data to the drilling operations. The received data can include data from current ongoing drilling operations as well as from past drilling operations, thereby providing a significant database of data regarding current and historical drilling operations.

In addition to receiving the data that may be collected by a monitoring system at the well 420, the aggregator 510 preferably receives additional data from the well 420 including, for example, the location of the well 420, the type of drilling equipment being used at the well 420, and any other relevant information that can be provided from the well 420. Data regarding the drilling equipment can include, for example, the BHA, the types of motors, the types of drill bits, and any other piece of drilling equipment that is relevant to the operation of a rig at a well 420. The location information can include, for example, coordinates, address, or other information sufficient to identify the location of the well 420. The drilling equipment and location information are preferably stored in the same manner as the other data by being associated with the corresponding well 420.

Data cleaning module 520 cleans all incoming data or stored data as tables for all the operators and rows to ensure the quality of the data is satisfactory and accurate. For example, if the rate of penetration (ROP) cannot be 1000 depth per foot, the data cleaning module 520 can be configured to correct or adjust the value, for example, to 600 or less. The data cleaning module 520 can also be configured to format the data from the wells 420 to a common format, both in regards to the label for that data or parameter, as well as the units for it. For example, if the ROP from one well 420 was provided in depth per meter and another provided in depth per foot, the data provided in depth per meter could be converted to depth per foot so that the data is consistent across all wells 420. Similarly, the data cleaning module 520 can be configured to recognize that data from different wells 420 are for the same data or parameter even if the label provided from the wells 420 differ, such as ROP from one and rate of penetration from another. The data cleaning module 520 can therefore enable the data from disparate wells 420 and monitoring systems to be stored in a consistent manner that ensures like data are stored consistently with the same labels and units across all wells 420.

Data modeling module 530 can be configured to access the data stored by the aggregator of 510 and cleaned or corrected by data cleaning module 520 to provide and/or calculate various parameters and pieces of information regarding specific wells 420, wells 420 in a particular region 410, or wells 420 across multiple regions 410. The provision and/or calculation of various parameters can be for a variety of parameters including, for example, drilling parameters like rate of penetration (ROP), weight on bit (WOB), revolutions per minute, and others. With access to data from numerous wells 420, the data modelling engine can determine these parameters for different time periods, regions, wells, and operators/drillers, either independent of each other or collectively. For example, data modelling module 530 can be configured to calculate and provide parametric data (e.g., rate of penetration) of a specific well 420, of all wells 420 operated by two or more different operators or drillers, of all wells 420 within a particular region, of all or some wells 420 across multiple regions, and/or for a particular period of time, such as in the past day, past week, past year, or past decade. This calculation and/or provision of such parametric data enables operators and drillers to evaluate current or future drilling operations and make decisions on how to implement or change such drilling operations including, for example, altering current settings of drilling operations and identifying and applying drilling equipment for a new well.

To capitalize on the extensive database of data from a multitude of wells across multiple regions and from both current and historic drilling operations, data modelling module 530 can be configured to include machine learning and/or other artificial intelligence (ML/AI) capabilities. As the database of data continually expands over time, the ML/AI within the data modelling module 530 can continue to improve and refine its calculations, identify patterns across and within particular regions and wells, and provide better and highly accurate performance results. With these improvements, operators and driller can make better and more informed decisions about how to modify current drilling operations at an existing well or implement new drilling operations at a new well.

GUI 540 can be configured to receive and present data, parameters, and other relevant information to operator and drillers based on the information provided from data modeling module 530. The GUI 540 can be a screen, display, TV, or other internet-enabled device that enables a user to see the information provided by data modeling module 530. Through the GUI 540, operators and drillers can compare their target well performance against nearby wells including wells operated by competitors (e.g., offset operators). This comparison enables operators and driller to gain a deep understanding of the true performance of their well and identify areas of improvement. The GUI 540 can be configured to provide the information in a variety of formats including, for example, in charts, spreadsheets, 2D and/or 3D mappings, or any other format that helps users to see current operations, evaluate comparisons among wells within a region or across regions, and identify trends and best performances according to drilling equipment, drilling performance, and drilling settings.

Insights that can be derived by operators and drillers include, for example, what is the best BHA design for a new well based on all nearby offset competitors, what are the best rotary speeds in any section of a well compared to nearby offset competitors, what are the best drilling parameters in any section of a well compared to nearby offset competitors, what are the best connection times, tripping speeds, and casing speeds compared to offset operators, what are BHA drift trends spatially, or what is the ROP trend shown spatially from start to finish of a well as a trend.

Figure 7:
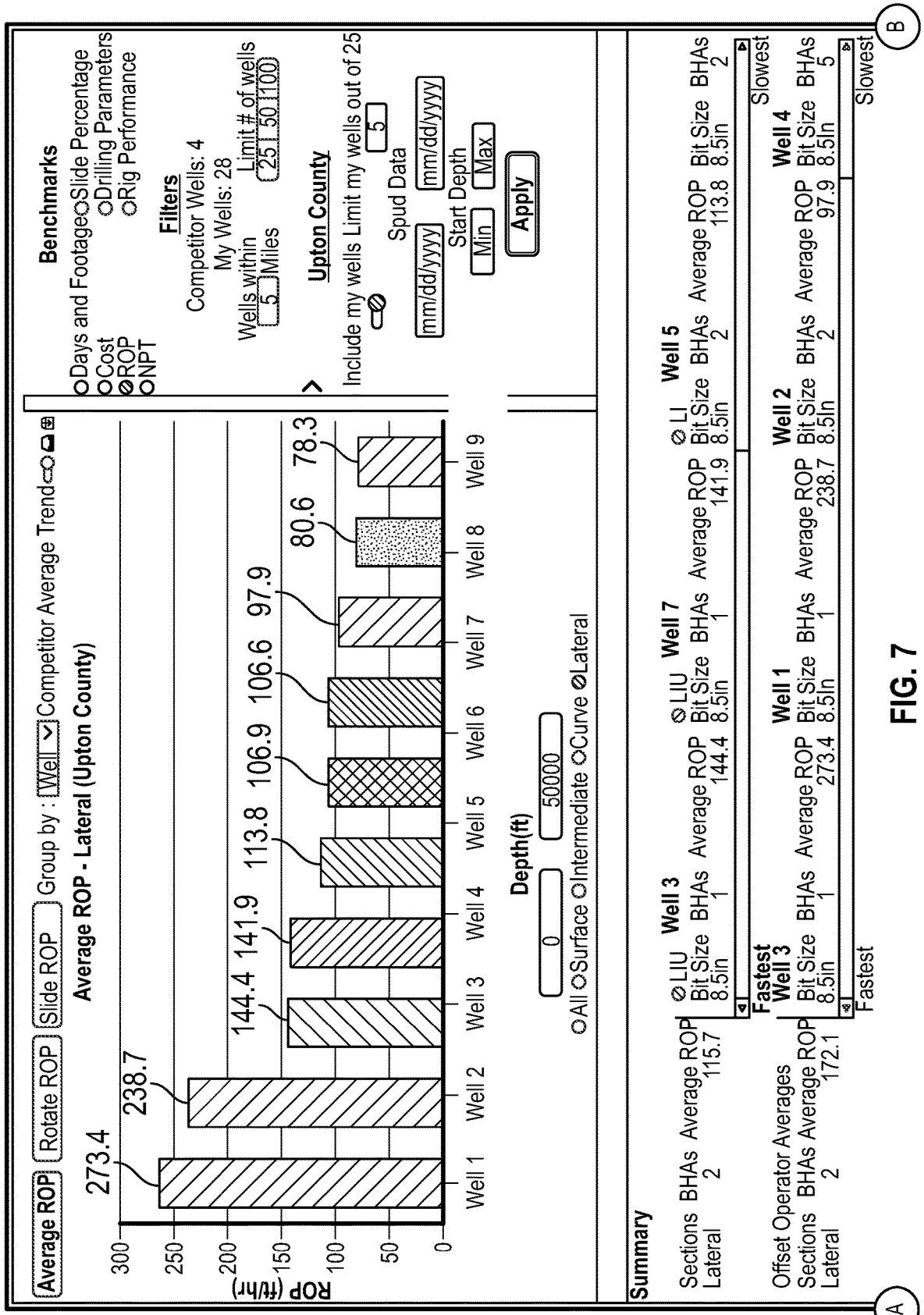
FIG. 7 is an example of a presentation on a GUI according to an embodiment.
Figure 7:
Figure 8:
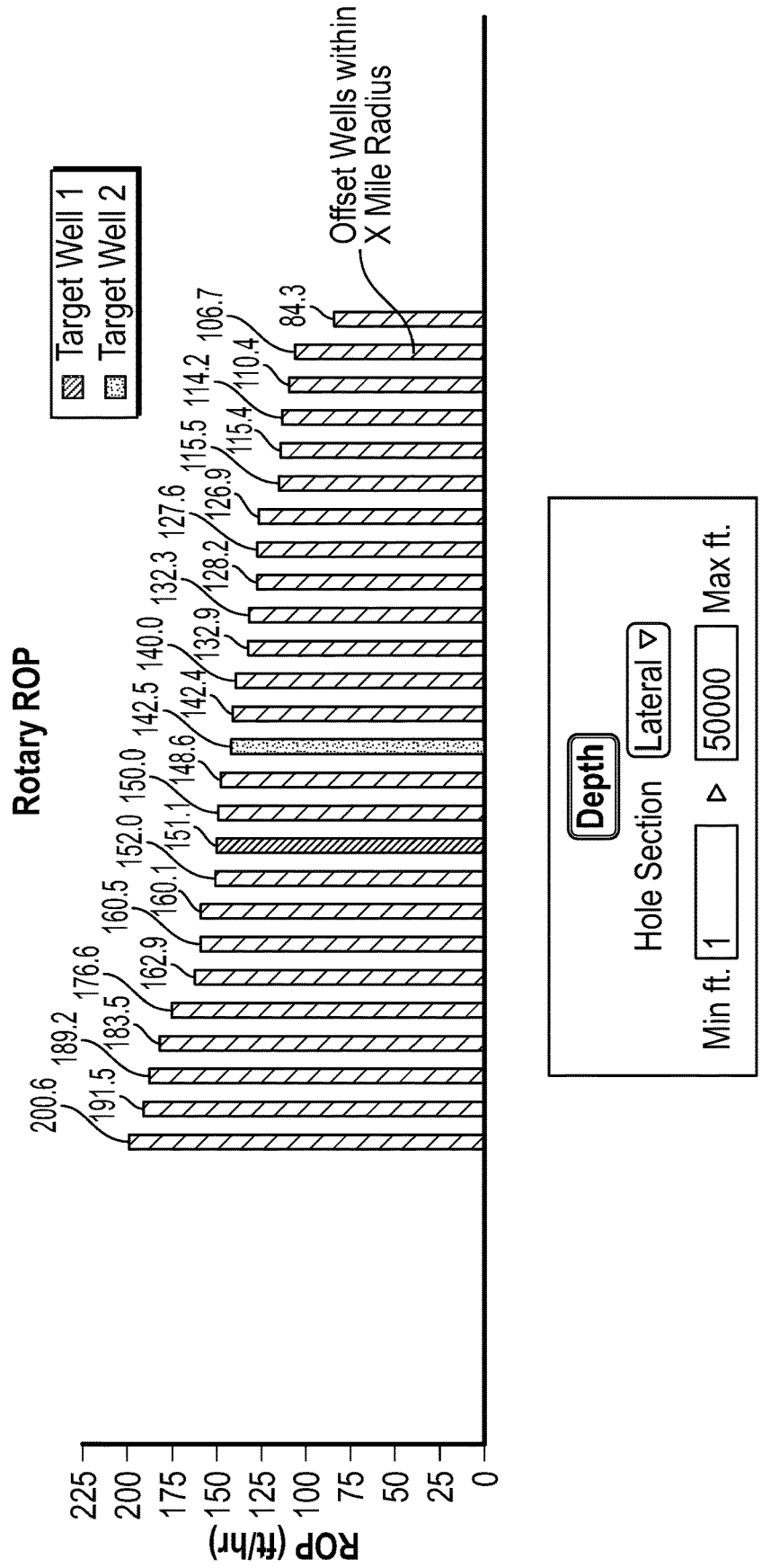
FIG. 8 is another example of a presentation on a GUI according to an embodiment.

FIGS. 6-8 show examples of presentations on a GUI according to an embodiment. As shown in FIG. 6, GUI 540 can present users with options of which information to be presented. Through this interface a user can select the information to be provided by data modelling module 530 including, for example, categories of days and costs such as days vs. depth, days, costs, non-productive time (NPT), and/or rig performance or categories of rate of penetration such as ROP, slide percent, and/or drilling parameters. The illustrated categories and types are merely exemplary and other categories and types of data can be selected.

FIG. 7 is an example of a presentation on GUI 540 according to an embodiment. As shown in FIG. 7, GUI 540 can present selected data provided by data modelling module 530 in a variety of formats. In one portion, that average ROP of a plurality of wells 420 in a particular region 410 (specifically, Upton County) is shown as a bar chart with the best performing wells 420 on the left and the worst performing ones on the right. Below the bar chart, the operator is able to select the performance of three wells, e.g., wells 3, 5, and 7, in comparison to the other offset wells. In particular, wells 3, 5, and 7 can be target wells such as the wells owned and operated by the user while the other wells or offset wells owned and operated by competitors. In addition to comparing ROPs, the comparison includes identification of bit size and BHAs. Finally, the lowest section shows even more information including BHA number, bit size, bit manufacturer, bit model, bit blades, bit cutter size, and motor manufacturer.

FIG. 8 is another example of a presentation on GUI 540 according to an embodiment. As shown in FIG. 8, rotary ROP data is presented in a bar chart for two target wells and offset wells within a specified mile radius of those target wells. Like the bar chart in FIG. 7, the best performing wells 420 are shown on the left and the worst performing ones are shown on the right. FIG. 8 also identifies two target wells. The target wells can the wells owned and operated by the user, whereas the other wells can be offset wells owned and operated by competitors.

Other figures, charts, spreadsheets, or other presentations can also be displayed on GUI 540. For example, a map of a country or region can be shown identifying all of the wells present in the displayed map as well as indications of which wells are owned or operated by a particular operator, driller, or drilling company. Through the GUI 540, a user can focus or zoom in on a particular portion of the map and set a central point and a circle/radius around that point (e.g., 1 mile, 5 miles, 10 miles, 100 miles, etc.). Once the circle/radius is set, the data modelling module 530 can collect relevant data and calculate parameters corresponding to each of the wells lying within the set circle/radius and present that information to the user through the GUI 540. Instead of a circle/radius, the user through the GUI 540, the user can also set arbitrary boundaries to select wells of interest or select regions 410 such as a particular county, basin, or formation.

One type of information that can be presented after making the selection of wells of interest, which will typically include both wells owned and operated by the user as well as wells of competitors, is a chart representing days versus depth. This chart can have days on the X-axis and depth on the Y-axis. The performance of each well can be illustrated as a line that starts at 0 depth on day 0 and proceeds day by day and depth achieved on each day until completion of the well. The chart can therefore illustrate how each well performs against the other wells including determining day-by-day performance as well as the number of days it took each well to reach completion. Moreover, since the data collected and provided by the data processing system of FIG. 5 collects the data in real-time, the chart can be continuously updated with each day's results. Although described on a day-by-day basis, the continuous, real-time updates can be provided and displayed in shorter increments than days including, for example, by hour, by minute, or by second.

GUI 540 can also be configured to provide pop-up menus when a cursor is placed over different portions of the information displayed on the GUI 540. The pop-up menus can include a list of different types of information that the user can select to display on the GUI 540 including details of a specific well or of all the wells in the selected region. For example, one useful metric for well performance is non-productive time (NPT). A pop-up menu can be displayed to the user that offers the option to see NPT for a particular well, such as one owned and operated by the user, or of all wells within the selected region. When selected, a chart can be presented illustrating the amount of NPT of each well including for a particular time period (e.g., a day or a week) or from beginning to end of the operation of each well.

The NPT information presented to the user through GUI 540 can also be broken down into individual segments representing the cause of the NPT. These segments include, for example, NPT due to casing running, casing running tools, liner hanger equipment or procedures, liner running operations, wellhead, poor cement job, cementing, BHA rotary equipment, directional drilling exclusive of MWD and mud motors, drill bits including hole openers, logging while drilling, mud motor, MWD tools, coring, logging, pressure integrity components and pressure testing equipment, wireline, fishing for debris in the hole, lost circulation, technical or mechanical sidetrack, stuck pipe, well control, downhole operations, mechanical or geological problems, wellbore fluids, directional drilling problems down how such as out of window or mistargets, force majeure, community relations, labor dispute, logistics and supply, regulatory or permitting, wait on day light, wait on equipment, wait on orders, weather conditions, pressure control equipment, coiled tubing, draw works, mud pump or system, rig contractor or service company equipment/personnel/procedures, top drive, or any other possible cause of NPT. The NPT segments can be illustrated to show proportionally the amount each segment contributes to overall NPT. With this segmented information of NPT, a user can determine what aspects of the well operation are causing the most NPT and take remedial measures, such as changing equipment or operating parameters, to address those causes. Similarly, by look at NPT information across all of the wells within a selected region, the user can determine what is causing NPT in other wells and see the equipment and operation parameters of wells with less NPT and use that information to make changes to well operations (e.g., different equipment, operation parameters) of a targeted well.

Figure 9A:
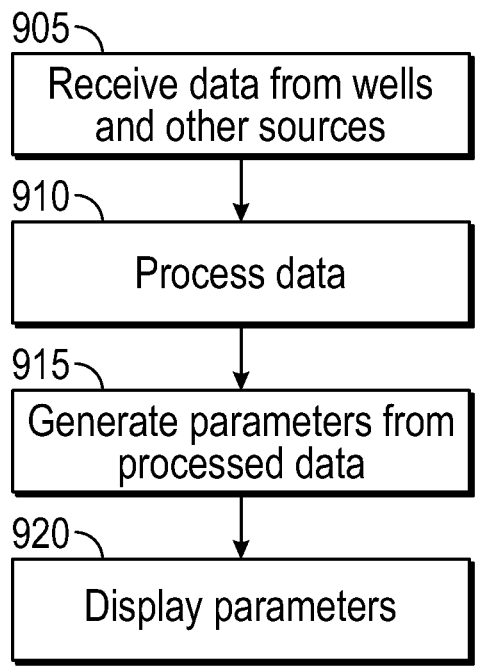
FIG. 9A is a flow chart of a data collection and display process according to an embodiment.

FIG. 9A is a flow chart of a data collection and display process according to an embodiment. As shown in FIG. 9A, data is received from one or more wells and other sources of data relevant to the operation of the wells (step 905). The data can be provided by a monitoring system like monitoring system 168 operating at the well, including data from one or more sensors implemented at the well, and transmitted to a data processing system like the system shown in FIG. 5. The data can be transmitted by a wired or wireless connection.

The data received by the data processing system then processes the received data (step 910). The processing of the received data includes collecting and storing the data, such as in a database implemented in a computer, server, or cloud, and cleaning and formatting the data, such as modifying data errors and unifying units and labelling. The received data stored in the database can include not only data representing operation parameters and sensed conditions at the wells, but also information about drilling equipment being used and location of the wells.

Based on the data stored in the database, one or more parameters can be generated (step 915). The data modelling module 530 of the data processing system can be configured to generate one or more parameters from the data stored in the database and can be responsive to inputs or requests from users, operators, or drillers to determine which parameters are calculated, from which wells, and from which regions. The generated parameters, along with any other desired relevant data, is then displayed (step 920). The information can be displayed on GUI 540 in a variety of different formats.

Figure 9B:
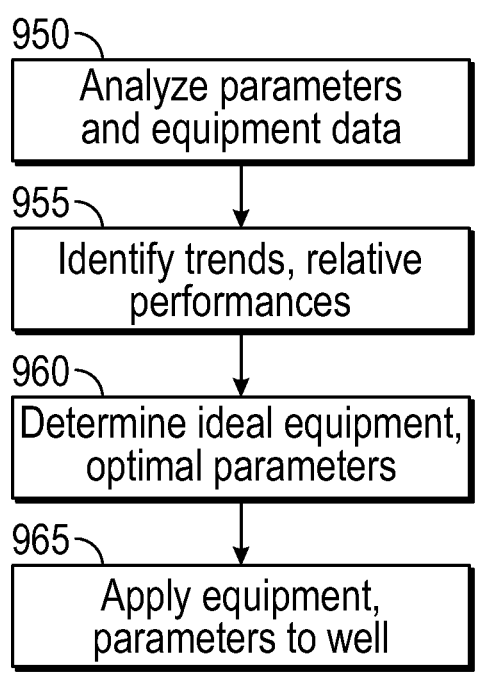
FIG. 9B is a flow chart of a data analysis and well operation selection process according to an embodiment.

FIG. 9B is a flow chart of a data analysis and well operation selection process according to an embodiment. As shown in FIG. 9A, after a user, operator, or driller has selected parameters and other information including equipment data from multiple wells operated by multiple different operators or drillers, an analysis is performed of those parameters and information (step 950). The analysis can be performed automatically, such as by the data modeling module 530, and can identify the best performing parameters, the best operating equipment, and any other relevant data that indicates the best or most effective operation among the wells. The analysis can also identify trends among the parameters and relative performance of the wells (step 955). The trends can, for example, illustrate what parameters or settings provide the best performance over time among a set of wells in a particular region. The relative performance can, for example, illustrate how wells in a particular region perform relative to other wells.

Based on the analysis and identified trends and relative performance, it can be determined what drilling equipment and operating parameters to use in a well (step 960). This determination preferably identifies the ideal drilling equipment to use as well as the optimal operating parameters for drilling in the well. For example, based on the operation of offset wells in a region, the operator or driller can identify the drilling equipment that performs best in that region before starting operation on a new well. Similarly, for an existing well, the operator or driller can identify the settings and operating parameters that might be modified to improve the operation of the existing well. The determination of drilling equipment and/or operating parameters can take into account the relative distance of other wells relative to a target well or new well. For example, the data and parameters of wells in closer proximity to the target or new well can be prioritized over data and parameters from more remote wells. Using this determination, the drilling equipment and operating parameters can be applied to the well (step 965).

The following provides examples of how the data analysis and well selection process can be used by operators and drillers to improve the implementation of rigs for new wells and improve the operation of rigs for existing wells. For example, regarding drilling equipment, operators and drillers can use the data processing system of FIG. 5 to review and analyze the BHAs and motors used in nearby wells, examine their performance, such as how long it takes to complete well portions, what is the probability of the BHA and motor selected to complete the well portions, and select for use the BHAs and motors providing the best performance for a new well or to change in an existing well.

In another example, by pulling and comparing Non-Productive Time (NPT) codes, which can be directly and seamlessly extracted from client office reporting systems, the data processing system including data cleaning module 520 can normalize all of the NPT codes by depth to ensure an apple-to-apple comparison. With the NPT data normalized, the user can determine if the rig rented from a rig contractor is performing satisfactorily and have the rig replace immediately if it is not.

In another example, a user can pull and compare field costs by depth and costs associated to each vendor and normalize all the cost by depth to ensure an apple-to-apple comparison. With the cost normalized, the user can easily identify which vendor may be charging higher rates and negotiate to get a better rate or replace the vendor completely. This cost can provide an ML/AI-based prediction on what will be projected cost per foot in a particular region in the next quarter compared to the previous quarter. If the costs are trending poorly, then the root cause of that cost trend can be identified by the vendor causing the poor trend and adjust accordingly.

In yet another example, a user can pull raw sensor data from numerous rigs in a region in real-time and determine the rig states operations automatically. The user can easily compare by well, hole section, depth interval, time range, motors/bit types/BHAs types, and formation combinations to develop better overall understanding on ongoing or upcoming planned operations. Further this information helps the user identify what is causing good or poor well performance, such as less sliding percentage or high rotational ROP. Armed with this insight, the user can easily develop a more detailed understanding of where and how the performance gain can be achieved. This insight allows the user to reduce their trial-and-error loops during the planning cycle by mixing and matching the best new technologies such as what is the ideal combination of BHA type/bit type/motor type to be leveraged, decide upfront on a two, three, or four string design, and revise current procedure changes which may be required upfront when compared to other.

Finally, in another example, by pulling raw sensor data from numerous rigs in a region in real time and determining the best drilling operating parameters such as ROP, Differential Pressure, Torque, Weight On Bit, the user can easily determine if the downhole drilling equipment, such as BHA, Bit, Motor, or rotary steerable system (RSS) combination, currently being used or about to be used needs to be altered. By comparing the performance from current drilling equipment and comparing it to performance of nearby drilling equipment, the user can decide to continue or replace certain components in subsequent operations to optimize those operations. Using these comparisons enables users to focus on critical performance improvement initiatives specific to their operating area being achieved by peers, which provides a significant improvement in performance, time, and costs.

According to the systems described previously, users, operators, and drillers are able to:

Create operational insights between your and offset competitor wells based on high resolution real time 1, 5, 10 second or faster sensor data to show automated slide times and rate of penetrations by hole sections, depth filters;

Create operational insights between your and offset competitor wells based on high resolution real time 1, 5, 10 second or faster sensor data to show automated rotation speeds by hole sections, depth filters;

Create operational insights between your and offset competitor wells based on high resolution real time 1, 5, 10 second or faster sensor data to show variety of drilling parameters by hole section, depth intervals as averages and medians without disclosing actual parameters;

Create operational insights between your and offset competitor wells based on high resolution real time 1, 5, 10 second or faster sensor data to show automatically variety of casing design parameters by hole section, depth intervals;

Create operational insights between your and offset competitor wells based on high resolution real time 1, 5, 10 second or faster sensor data to show automatically calculated true slopes by hole section, depth intervals;

Create operational insights between your and offset competitor wells based on high resolution real time 1, 5, 10 second or faster sensor data to show automated slide footage by hole sections, depth filters;

Create operational insights between your and offset competitor wells based on high resolution real time 1, 5, 10 second or faster sensor data to show automated rig performance metrics like tripping and casing speeds by hole sections, depth filters;

Create operational insights between your and offset competitor wells based on high resolution real time 1, 5, 10 second or faster sensor data to show automated rig performance metrics by hole sections, depth filters;

Create operational insights between your and offset competitor wells based on high resolution real time 1, 5, 10 second or faster sensor data to show BHA performance and BHA assembly design by hole section, size and depth filters;

Create operational insights between your and offset competitor wells based on high resolution real time 1, 5, 10 second or faster sensor data to show mud weights by hole sections, depth filters; and Create operational insights between your and offset competitor wells based on normalized NPT (Non-productive time) data by hole sections, depth filters including normalizing all different NPT data received from the clients to ensure it can be mapped to create apple to apple comparison.

According to the systems described previously, users, operators, and drillers are also able to:

Leverage machine learning AI models to provide automated answers on why certain rig performance metrics compared to offset operators result in better or worse performance, such as why tripping speed is faster than offset competitor wells in the area of interest;

Leverage machine learning AI models to provide automated answers on why certain drilling performance metrics compared to offset operators result in better or worse performance, such as the best selection of downhole hardware and drilling parameters to drill a consistent well;

Leverage primary and offset data nearby from your or offset competitor wells to spatially (using maps) represent wells drilled or drilling as sticks in a plan view and giving user an ability to see a variety of well performance metrics as trends during or post drilling operations such as ROP variances from surface hole to finish (true depth) on all wells;

Leverage primary and offset data nearby from your or offset competitor wells to spatially (using map view) represent wells drilled or drilling as sticks in a plan view and show drilling parameters like WOB, Torque, Differential Pressure variances as trends on the well sticks from surface hole to finish (true depth) on each well by BHA (bore hole assembly);

Leverage primary and offset data nearby from your or offset competitor wells to spatially (using map view) represent wells drilled or drilling as sticks in a plan view and show drilling parameters like ROP, WOB, Torque, Differential Pressure variances as trends on the well sticks from surface hole to finish (true depth) on each well by formations;

Leverage primary and offset data nearby from your or offset competitor wells to spatially (using map view) represent wells drilled or drilling as sticks in a plan view and show drilling parameters like ROP, WOB, Torque, Differential Pressure variances as trends on the well sticks from surface hole to finish (true depth) on each well by surface section like surface hole, intermediate hole section, lateral hole section and curve hole section;

Leverage primary and offset data nearby from your or offset competitor wells to spatially (using maps) represent wells as sticks seeing from a plan view and show downhole tools drift tendencies as a trend from surface hole to true depth;

Leverage primary and offset data nearby from your or offset competitor wells to spatially (using maps) represent wells as sticks seeing from a plan view and show different BHAs used on each well stick in the spatial view for well drilled or drilling;

Leverage primary and offset data nearby from your or offset competitor wells to spatially (using maps) represent wells as sticks seeing from a plan view and show costs as a trend from start to finish of the wells, such as cost per foot, cost per section footage, or total costs, so that the user can determine what areas or sections are drilling cheaper or expensive;

Leverage primary and offset data nearby from your or offset competitor wells to spatially (using maps) represent wells as sticks seeing from a plan view and show mud weight trends from start to finish of the wells or by hole sections;

Leverage primary and offset data nearby from your or offset competitor wells to spatially (using maps) represent wells as sticks seeing from a plan view and show mud non-productive times on each well stick to give a user non-productive time trends on all wells in the map and areas of improvements; and Leverage primary and offset data nearby from your or offset competitor wells to spatially (using maps) represent wells as sticks seeing from a plan view and show energy consumption trends on well sticks from surface hole to true depth of well so a user can understand what areas or wells are consuming more or less energy by simply looking at a map view.

Various embodiments of the invention are contemplated in addition to those disclosed hereinabove. The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

The invention claimed is:

1. A system, comprising:
a plurality of monitoring systems implemented at drilling rigs of a plurality of wells operated by a plurality of operators in a region, each monitoring system comprising a plurality of sensors comprising at least two of a hook weight sensor to sense a weight on bit (WOB), a mud pump sensor to sense mud pump speed, or a revolutions per minute (RPM) sensor to sense a rotary table RPM;
a memory; and
one or more processing devices operatively coupled to the memory, the one or more processing devices configured to:
receive, from the plurality of monitoring systems, a plurality of data describing drilling operations at the plurality of wells operated by the plurality of operators in the region, the plurality of data comprising real-time data from the plurality of sensors at each of the plurality of wells and real-time data regarding equipment used for the respective drilling operations at each of the plurality of wells;
perform a data cleaning to unify labels, units, or ranges, of the received plurality of data to a standard format or validate the received plurality of data;
display, on a graphical user interface (GUI), a map of wells and receive, through the GUI, a first user input from a user comprising a shape that identifies the region in the displayed map that encompasses the plurality of wells;
calculate a plurality of parameters for each of the plurality of drilling operations based on the real-time data from the plurality of sensors at each of the plurality of wells;
display a selection of the real-time data or a selection of the plurality of parameters for each of the plurality of wells present in the region identified by the first user input;
identify optimal equipment and an optimal operating parameter to use for a drilling operation of a new well within the region based on the real-time data and the calculated parameters and based on a relative distance between the plurality of wells and the new well so that the real-time data and the calculated parameters of wells in the region in closer proximity to the new well are prioritized over the real-time data and the calculated parameters of wells in the region farther from the new well; and
provide a remote access to compare in real-time a performance of the drilling operation of the new well to the calculated parameters relating to drilling operations from the plurality of wells operated by the plurality of operators, wherein the calculated parameters correspond to actual operating conditions for the drilling operations operated by the plurality of operators.

2. The system of claim 1, wherein the one or more processing devices are further configured to adjust the optimal operating parameter of the drilling operation of the new well during drilling based on at least one of the calculated parameters.

3. The system of claim 1, wherein the optimal equipment includes at least one of a bottom hole assembly (BHA), a motor, or a drill bit.

4. The system of claim 1, wherein the one or more processing devices are further configured to: receive a second user input from a user;
determine at least one data or at least one parameter in response to the second user input; and display the determined data or parameter for each of the plurality of wells in a format that shows the determined data or parameter of each of the plurality of wells relative to each other.

5. The system of claim 1, wherein the first user input includes a location within the displayed map and an indication of a distance from the location, and wherein the region corresponds to a circle encompassing the location and having a radius corresponding to the indicated distance.

6. The system of claim 1, wherein the region is one of a county, a basin, or a formation.

7. A method for operating a drilling operation at a new well comprising:
receiving, from a plurality of monitoring systems, a plurality of data describing drilling operations at a plurality of wells operated by a plurality of operators in a region, each monitoring system comprising a plurality of sensors comprising at least two of a hook weight sensor to sense a weight on bit (WOB), a mud pump sensor to sense mud pump speed, or a revolutions per minute (RPM) sensor to sense a rotary table RPM, the plurality of data comprising real-time data from a plurality of sensors at each of the plurality of wells and real-time data regarding equipment used for the respective drilling operations at each of the plurality of wells;

performing a data cleaning to unify labels, units, or ranges, of the received plurality of data to a standard format or validate the received plurality of data;

displaying, on a graphical user interface (GUI), a map of wells and receive, through the GUI, a first user input from a user comprising a shape that identifies the region in the displayed map that encompasses the plurality of wells;

calculating a plurality of parameters for each of the plurality of drilling operations based on the real-time data from the plurality of sensors at each of the plurality of wells;

displaying a selection of the real-time data or a selection of the plurality of parameters for each of the plurality of wells present in the region identified by the first user input;

identifying optimal equipment and an optimal operating parameter to use for a drilling operation of a new well within the region based on the real-time data and the calculated parameters and based on a relative distance between the plurality of wells and the new well so that the real-time data and the calculated parameters of wells in the region in closer proximity to the new well are prioritized over the real-time data and the calculated parameters of wells in the region farther from the new well; and providing a remote access to compare in real-time a performance of the drilling operation of the new well to the calculated parameters relating to drilling operations from the plurality of wells operated by the plurality of operators, wherein the calculated parameters correspond to actual operating conditions for the plurality of drilling operations operated by the plurality of operators.

8. A method according to claim 7, further comprising adjusting the optimal operating parameter of the drilling operation of the new well during drilling based on at least one of the calculated parameters.

9. A method according to claim 7, wherein the optimal equipment includes at least one of a bottom hole assembly (BHA), a motor, or a drill bit.

10. A method according to claim 7, wherein the first user input includes a location within the displayed map and an indication of a distance from the location, and wherein the region corresponds to a circle encompassing the location and having a radius corresponding to the indicated distance.

11. A method according to claim 7, wherein the region is one of a county, a basin, or a formation.

12. A non-transitory, computer-readable medium storing instructions that, when executed by a processor, control a device to implement a method comprising:

receiving, from a plurality of monitoring systems, a plurality of data describing drilling operations at a plurality of wells operated by a plurality of operators in a region, each monitoring system comprising a plurality of sensors comprising at least two of a hook weight sensor to sense a weight on bit (WOB), a mud pump sensor to sense mud pump speed, or a revolutions per minute (RPM) sensor to sense a rotary table RPM, the plurality of data comprising real-time data from a plurality of sensors at each of the plurality of wells and real-time data regarding equipment used for the respective drilling operations at each of the plurality of wells;

performing a data cleaning to unify labels, units, or ranges, of the received plurality of data to a standard format or validate the received plurality of data;

displaying, on a graphical user interface (GUI), a map of wells and receive, through the GUI, a first user input from a user comprising a shape that identifies the region in the displayed map that encompasses the plurality of wells;

calculating a plurality of parameters for each of the plurality of drilling operations based on the real-time data from the plurality of sensors at each of the plurality of wells;

displaying a selection of the real-time data or a selection of the plurality of parameters for each of the plurality of wells present in the region identified by the first user input;

identifying optimal equipment and an optimal operating parameter to use for a drilling operation of a new well within the region based on the real-time data and the calculated parameters and based on a relative distance between the plurality of wells and the new well so that the real-time data and the calculated parameters of wells in the region in closer proximity to the new well are prioritized over the real-time data and the calculated parameters of wells in the region farther from the new well; and providing a remote access to compare in real-time a performance of the drilling operation of the new well to the calculated parameters relating to drilling operations from the plurality of wells operated by the plurality of operators, wherein the calculated parameters correspond to actual operating conditions for the drilling operations operated by the plurality of operators.

13. A non-transitory, computer-readable medium according to claim 12, the method further comprising adjusting the optimal operating parameter of the drilling operation of the new well during drilling based on at least one of the calculated parameters.

14. The system of claim 1, wherein the plurality of data describing drilling operations at the plurality of wells includes one or more Non-Productive Time (NPT) codes describing non-productive time realized at the plurality of drilling operations, wherein each NPT code comprises a time period of the non-productive time and a cause of the non-productive time, and wherein the one or more processing devices are further configured to display a graphical representation of the non-productive time realized at a selected drilling operation of the plurality of drilling operations.

15. The system of claim 14, wherein to perform the data cleaning further comprises to normalize the one or more NPT codes by depth.

16. The method of claim 7, wherein the plurality of data describing drilling operations at the plurality of wells includes one or more Non-Productive Time (NPT) codes describing non-productive time realized at the plurality of drilling operations, wherein each NPT code comprises a time period of the non-productive time and a cause of the non-productive time, the method further comprising displaying a graphical representation of the non-productive time realized at a selected drilling operation of the plurality of drilling operations.

17. The method of claim 16, wherein performing the data cleaning further comprises normalizing the one or more NPT codes by depth.

18. The non-transitory, computer-readable medium according to claim 12, wherein the plurality of data describing drilling operations at the plurality of wells includes one or more Non-Productive Time (NPT) codes describing non-productive time realized at the plurality of drilling operations, wherein each NPT code comprises a time period of the non-productive time and a cause of the non-productive time, the method further comprising displaying a graphical representation of the non-productive time realized at a selected drilling operation of the plurality of drilling operations.

19. The non-transitory, computer-readable medium according to claim 18, wherein performing the data cleaning further comprises normalizing the one or more NPT codes by depth.

* * * * *